(12) United States Patent
Marchetti et al.

(10) Patent No.: US 8,341,046 B2
(45) Date of Patent: *Dec. 25, 2012

(54) PAYMENT ENTITY DEVICE RECONCILIATION FOR MULTIPLE PAYMENT METHODS

(75) Inventors: John N. Marchetti, Monrovia, MD (US); Matthew Mullen, Danville, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/030,824

(22) Filed: Feb. 13, 2008

(65) Prior Publication Data

US 2009/0112662 A1   Apr. 30, 2009

Related U.S. Application Data

(63) Continuation-in-part of application No. 11/929,033, filed on Oct. 30, 2007.

(51) Int. Cl.
*G06Q 10/00* (2012.01)
(52) U.S. Cl. ............... 705/35; 705/7; 705/30; 705/64; 705/1; 705/45
(58) Field of Classification Search .............. 705/1, 7, 705/30–45, 64
See application file for complete search history.

(56) References Cited

U.S. PATENT DOCUMENTS

| | | |
|---|---|---|
| 5,790,677 A | 8/1998 | Fox et al. |
| 5,826,241 A | 10/1998 | Stein et al. |
| 5,850,446 A | 12/1998 | Berger |
| 5,898,777 A | 4/1999 | Tycksen et al. |
| 5,956,695 A | 9/1999 | Carrithers et al. |
| 6,012,048 A | 1/2000 | Gustin et al. |
| 6,032,133 A | 2/2000 | Hilt et al. |
| 6,208,973 B1 | 3/2001 | Boyer et al. |
| 6,292,789 B1 | 9/2001 | Schutzer |
| 6,308,887 B1 | 10/2001 | Korman et al. |
| 6,366,893 B2 | 4/2002 | Hannula et al. |
| 6,408,284 B1 | 6/2002 | Hilt et al. |
| 6,609,113 B1 | 8/2003 | O'Leary et al. |
| 6,611,818 B1 | 8/2003 | Mersky et al. |

(Continued)

FOREIGN PATENT DOCUMENTS

WO   WO 2006/124808 A1   11/2006

OTHER PUBLICATIONS

American Express; S2S eInvoice & Pay; The Automated Invoice and Payment Solution that Drives Efficiencies and Cost Savings; EIPSFactSheet-0707; retrieved from internet Feb. 2008; <http://corp.americanexpress.com/gcs/s2s/einvoicepay/docs/S2S_eInvoicePay-Factsheet.pdf>.

(Continued)

*Primary Examiner* — Tien Nguyen
(74) *Attorney, Agent, or Firm* — Kilpatrick Townsend & Stockton LLP

(57) ABSTRACT

A method begins by storing payment request data, which, for a client, includes a payables profile and an accounts payable data file. The method continues by receiving payment remittance information subsequent to initiation of a payment in accordance with the payment request data. The method continues by storing the payment remittance information. The method continues by consolidating the payment remittance information and the payment request data to produce consolidated payment data. The method continues by generating at least one report based on the consolidated payment data.

24 Claims, 11 Drawing Sheets

U.S. PATENT DOCUMENTS

| | | | |
|---|---|---|---|
| 6,704,714 B1 | 3/2004 | O'Leary et al. | |
| 6,932,268 B1 | 8/2005 | McCoy et al. | |
| 6,996,542 B1 | 2/2006 | Landry | |
| 6,999,943 B1* | 2/2006 | Johnson et al. | 705/39 |
| 7,003,495 B1 | 2/2006 | Burger et al. | |
| 7,031,940 B2 | 4/2006 | Shigemi et al. | |
| 7,058,611 B2 | 6/2006 | Kranzley et al. | |
| 7,103,579 B1 | 9/2006 | Phillips et al. | |
| 7,124,937 B2 | 10/2006 | Myers et al. | |
| 7,156,294 B2 | 1/2007 | Roth | |
| 7,269,575 B1 | 9/2007 | Concannon et al. | |
| 7,313,545 B2 | 12/2007 | Degen et al. | |
| 7,321,874 B2 | 1/2008 | Dilip et al. | |
| 7,792,712 B2 | 9/2010 | Kantarjiev et al. | |
| 7,792,717 B1 | 9/2010 | Hankins et al. | |
| 7,930,248 B1* | 4/2011 | Lawson et al. | 705/40 |
| 2001/0034702 A1 | 10/2001 | Mockett et al. | |
| 2001/0037209 A1 | 11/2001 | Tarbutton et al. | |
| 2002/0023053 A1 | 2/2002 | Szoc et al. | |
| 2002/0032653 A1 | 3/2002 | Schutzer | |
| 2002/0111886 A1 | 8/2002 | Chenevich et al. | |
| 2002/0111915 A1* | 8/2002 | Clemens et al. | 705/64 |
| 2002/0111916 A1* | 8/2002 | Coronna et al. | 705/64 |
| 2002/0116331 A1* | 8/2002 | Cataline et al. | 705/39 |
| 2002/0152124 A1 | 10/2002 | Guzman et al. | |
| 2002/0194138 A1 | 12/2002 | Dominguez et al. | |
| 2003/0055792 A1 | 3/2003 | Kinoshita et al. | |
| 2003/0088462 A1 | 5/2003 | Carrithers et al. | |
| 2003/0195819 A1 | 10/2003 | Chen et al. | |
| 2004/0117302 A1* | 6/2004 | Weichert et al. | 705/40 |
| 2004/0128240 A1 | 7/2004 | Yusin | |
| 2004/0143527 A1 | 7/2004 | Benkert et al. | |
| 2004/0215560 A1 | 10/2004 | Amalraj et al. | |
| 2004/0230526 A1 | 11/2004 | Praisner | |
| 2005/0033609 A1 | 2/2005 | Yang | |
| 2005/0049974 A1 | 3/2005 | Jani et al. | |
| 2005/0096011 A1 | 5/2005 | Yoshida et al. | |
| 2005/0119918 A1 | 6/2005 | Berliner | |
| 2005/0177494 A1 | 8/2005 | Kelly et al. | |
| 2005/0184145 A1 | 8/2005 | Law et al. | |
| 2006/0068897 A1 | 3/2006 | Sanford et al. | |
| 2006/0074799 A1 | 4/2006 | Averyt et al. | |
| 2006/0178986 A1 | 8/2006 | Giordano et al. | |
| 2006/0206425 A1 | 9/2006 | Sharma | |
| 2006/0265298 A1 | 11/2006 | Lee et al. | |
| 2006/0266821 A1 | 11/2006 | Zajkowski et al. | |
| 2007/0016526 A1 | 1/2007 | Hansen et al. | |
| 2007/0038560 A1 | 2/2007 | Ansley | |
| 2007/0067239 A1 | 3/2007 | Dheer et al. | |
| 2007/0124224 A1 | 5/2007 | Ayers et al. | |
| 2007/0150411 A1 | 6/2007 | Addepalli et al. | |
| 2007/0168234 A1 | 7/2007 | Rutkowski et al. | |
| 2007/0198277 A1 | 8/2007 | Philipp et al. | |
| 2007/0255669 A1 | 11/2007 | Kashanov | |
| 2007/0282743 A1 | 12/2007 | Lovelett et al. | |
| 2007/0288377 A1 | 12/2007 | Shaked | |
| 2008/0010204 A1 | 1/2008 | Rackley, III et al. | |
| 2008/0011825 A1 | 1/2008 | Giordano et al. | |
| 2008/0015985 A1* | 1/2008 | Abhari et al. | 705/42 |
| 2008/0033878 A1 | 2/2008 | Krikorian et al. | |
| 2008/0086417 A1 | 4/2008 | Bykov | |
| 2008/0133407 A1* | 6/2008 | Guillory et al. | 705/40 |
| 2008/0154769 A1 | 6/2008 | Anderson et al. | |
| 2008/0162341 A1* | 7/2008 | Zimmer et al. | 705/40 |
| 2008/0235101 A1 | 9/2008 | Piepenbrink et al. | |
| 2009/0063353 A1 | 3/2009 | Viidu et al. | |
| 2009/0076953 A1 | 3/2009 | Saville et al. | |

OTHER PUBLICATIONS

Mastercard Advisors; Purchase Logic.

Mastercard Worldwide; Payment Gateway; MPG-Buyer 01; retrieved from internet Feb. 2008; <https://www.mastercardpaymentgateway.com/mpgpublic/pdf/buyers_sell_sheet.pdf>.

Mastercard Worldwide; Payment Gateway; MPG-Supplier 01; retrieved from internet Feb. 2008; <https://www.mastercardpaymentgateway.com/mpgpublic/pdf/supplier_sell_sheet.pdf>.

Notice of Allowance mailed Jun. 26, 2012 in related U.S. Appl. No. 12/030,804, 33 pages.

Notice of Allowance mailed Jun. 27, 2012 in related U.S. Appl. No. 12/030,785, 27 pages.

* cited by examiner

Payable Profile 140

| Creditor | AP type | Payment Method | Payment Terms | Financial Inst. |
|---|---|---|---|---|
| Supplier ABC | Price ≥ X | credit card | net 30 | Bank "A" |
| | Goods – Category 1 | line of credit | - | Bank "A" |
| Supplier B | All | wire transfer | per AP | Bank "A" |
| Supplier DEF | Services – Category 1 | debit account | - | Bank "A" |
| | Services – Category 2 | check | net 30 | Bank "B" |
| | Goods – Category I | credit card | per AP | Bank "C" |
| | Goods – Category II | tangible consid. | - | Entity "A" |
| | loan payment | wire | - | Bank "A" |
| Supplier D | All for date 1 through date 2 | promissory note | - | VC "1" |
| | All goods/services after date 2 | credit card | net 30 | Bank "A" |
| | pay note | check | net 15 | Bank "B" |
| | Goods – Category "a" | account credit | - | - |
| Supplier E | All others | credit card | net 45 | Bank "B" |

FIG. 5

Payable Profile 140

| Creditor | AP type | Payment Method | Payment Terms | Financial Inst. |
|---|---|---|---|---|
| Supplier DEF | Services – Category 1 | debit account | - | Bank "A" |
| | Services – Category 2 | check | net 30 | Bank "B" |
| | Goods – Category I | credit card | per AP | Bank "C" |
| | Goods – Category II | tangible consid. | - | Entity "A" |
| | loan payment | wire | - | Bank "A" | accounts payable data file 150

| Supplier | Invoice # | Invoice Date | Item | Qty | Unit $ | Subtotal | Tax | S&H | Total | Alt. pay method |
|---|---|---|---|---|---|---|---|---|---|---|
| DEF | 2001 | 1/1/08 | AAA | 12 | $33.30 | $399.60 | $33.30 | $75.50 | $508.40 | check, net-45 |
| | 2002 | 1/2/08 | XXX | 12 | $3.33 | $39.96 | $3.30 | $7.50 | $50.76 | no |
| | 2003 | 1/3/08 | zzz | 10 | $3.00 | $30.00 | $3.00 | $7.50 | $43.50 | no |
| | 2004 | 1/4/08 | mmm | 1 | $300.00 | $300.00 | $30.00 | $75.50 | $435.50 | no |
| Totals: | | | | | | $769.56 | $69.60 | $166.00 | $1,038.16 | | payment data 152 for Supplier DEF

| Invoice # | Invoice Date | Item | AP type | Total | Payment Method | Payment Terms | Financial Inst. | Payment Date |
|---|---|---|---|---|---|---|---|---|
| 2001 | 1/1/08 | AAA | Services – Category 1 | $508.40 | *check* | *net 45* | *Bank "B"* | *2/15/08* |
| 2002 | 1/2/08 | XXX | Services – Category 2 | $50.76 | check | net 30 | Bank "B" | 2/2/08 |
| 2003 | 1/3/08 | ZZZ | Goods – Category I | $43.50 | credit card | per AP | Bank "C" | today |
| 2004 | 1/4/08 | mmm | Goods – Category II | $435.50 | tangible consid. | - | Entity "A" | 1/19/08 |
| | | loan | loan payment | $500.00 | wire | - | Bank "A" | today |

FIG. 7

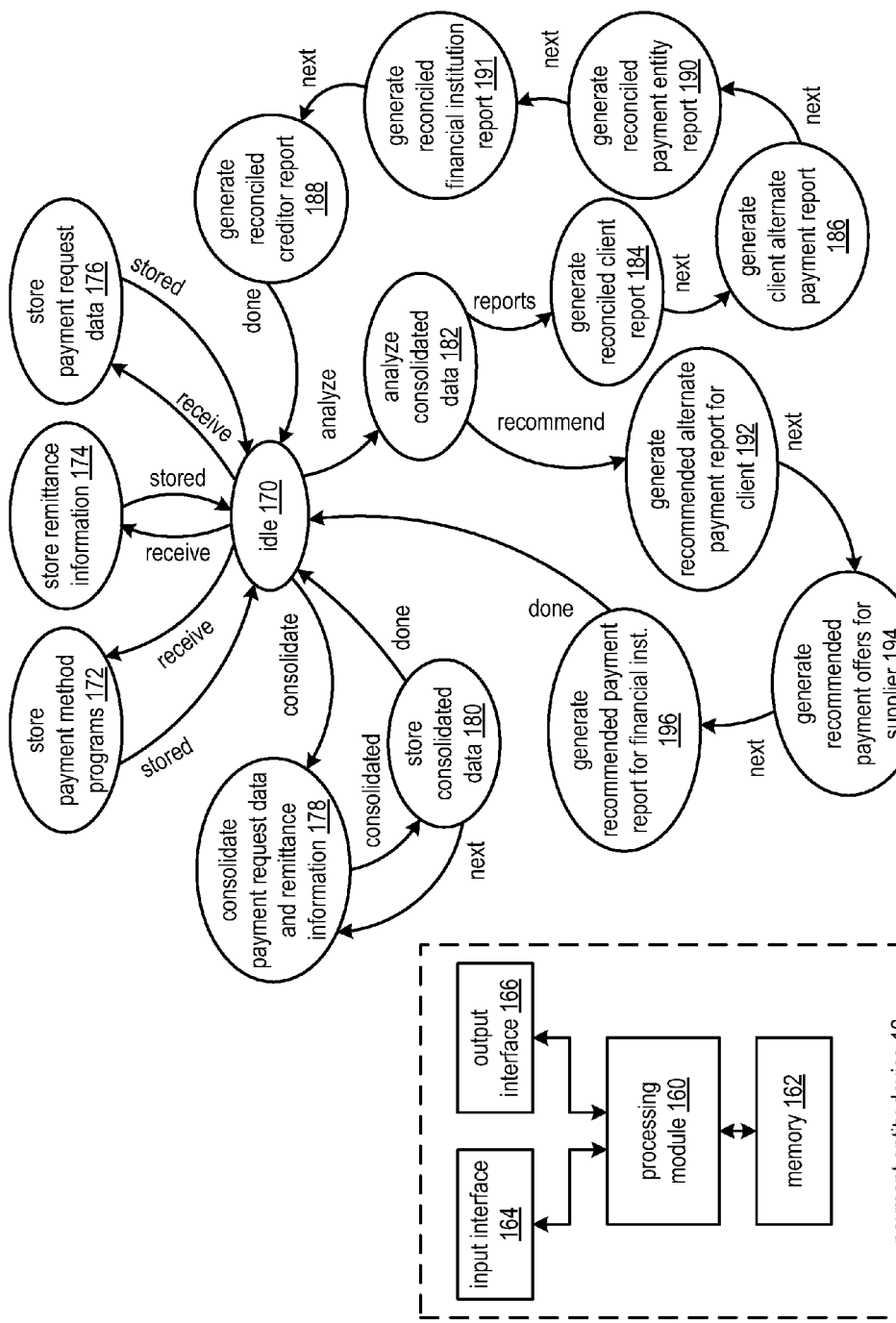

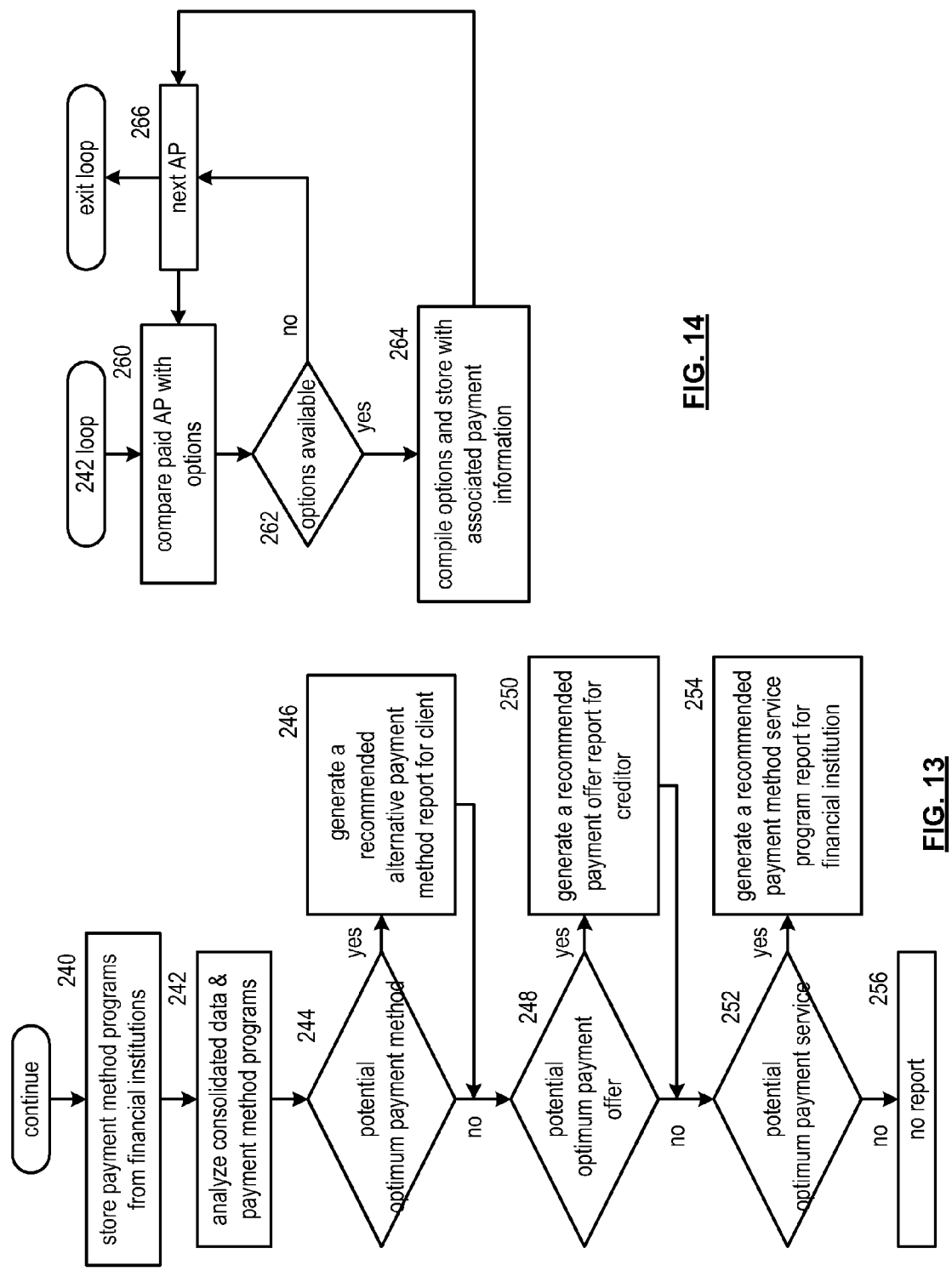

PAYMENT ENTITY DEVICE RECONCILIATION FOR MULTIPLE PAYMENT METHODS

CROSS-REFERENCE TO RELATED PATENTS

This patent application is claiming priority under 35 USC §120 as a continuation-in-part patent application of co-pending patent application entitled "System and Method for Processing Multiple Methods of Payment," having a filing date of Oct. 30, 2007, and a Ser. No. 11/929,033.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical field of the Invention

This invention relates generally to communication systems and more particularly to financial transactions communication systems.

2. Description of Related Art

Millions of credit card transactions are accurately processed every day regardless of whether the purchaser is making a purchase in his/her home town, in another part of the world, or via the internet. Each transaction has a two stage process: authorization and clearing & settlement. Authorization is the process of approving or declining the transaction at the commencement of the transaction and clearing & settlement is the process of making the payment and accounting for the payment.

The authorization process begins when a point-of-sale terminal (physical for in-store purchases, virtual for internet purchases) reads a purchaser's credit card information and obtains a transaction amount. The terminal transmits the credit card information and the transaction amount to an acquirer bank, which combines the credit card information and the transaction amount into an authorization request. The acquirer bank transmits the authorization request to a proprietary transaction processing network (e.g., VisaNet®), which routes the authorization request to an issuer bank (i.e., the bank that issued the credit card). Alternatively, the proprietary transaction processing network may perform a stand-in review and authorization.

When the authorization request is sent to the issuer bank, the bank, or a designated third party, reviews the request and approves or denies it. The issuer bank transmits a response to the proprietary transaction processing network indicating its decision. The proprietary transaction processing network forwards the response to the acquirer bank, which in turn, forwards the response to the point-of-sale terminal.

The clearing & settlement process begins with clearing, which, in turn, begins when the point-of-sale terminal, or other merchant processing device, transmits sales draft information (e.g., account numbers and amounts) to the acquirer bank. The acquirer bank formats the sales draft information into a clearing message that it transmits to the proprietary transaction processing network. The network transmits the clearing message to the issuer bank, which calculates settlement obligations of the issuer bank, processing fees, and the amount due the acquirer bank. Settlement begins when the issuer bank transmits funds to a designated bank of the proprietary transaction processing network, which, after processing, transfers the funds to the acquirer bank.

In an alternate credit card transaction processing system, the proprietary transaction network is owned by a single issuer bank. Thus, in contrast with the previously described system, the alternative system includes only one issue bank, not a large number of issuer banks, and, as such, the issuer bank's functions and the proprietary transaction network functions previously discussed are merged. In this alternate system, the processing of the single issuer is less than the multiple issuer system but creates a processing bottleneck due to the single issuer.

Regardless of the type of credit card transaction processing system, such systems provides consumers, whether individuals, small companies, or large corporate entities, an easy mechanism for paying for goods and/or services. For instance, many businesses use credit cards to purchase goods and/or services from a variety of suppliers as part of their procurement and payment processes. While businesses use credit cards to purchase goods and services, they also use other forms of payment as part of their procurement and payment processes. For example, a business may purchase goods and/or services using a check, a wire transfer, and/or an automated clearing house (ACH) debit account.

Software programs have been developed to assist businesses with their procurement and payment processes. Such software programs include provisions for tracking inventory, generating purchase orders, requesting invoices, and initiating and tracking payments for the desired goods and/or services. Once a payment is initiated, depending on the type of payment, it is processed outside of the software via the appropriate system. For example, a credit card transaction is processed as discussed above. After the payment is made, it is reconciled and the reconciled payment information is provided back to the business, or to its software. While this approach reduces the burdens on a business to purchase and pay for goods and/or services, it still requires a fair amount of input from the business to initiate payments, track them, and process the reconciled data.

Recently, proprietary transaction processing network providers have partnered with procurement and payment software entities to further reduce the burdens of a business by integrating the procurement and payment software with credit card payment processing. Such integration provides relatively seamless payment for goods and/or services being purchased with a credit card. Further, in a single issuer system, the system is capable of processing payments made via a check or an ACH debit account. As such, in a single issuer system, check payments and/or ACH debit account payments may be offered to the business.

While such advancements are reducing the payment and tracking burdens of a business, they are still somewhat disjointed, still require additional business involvement, and require involvement of the supplier financial chain (e.g., merchant, merchant's bank, etc.). For instance, in the integrated credit card payment system, the business still needs to process transactions using other forms of payment, which involves the supplier financial chain. In the single issuer system, the business is limited to using a credit card issued by the provider of the single issuer system, which dramatically limits payments options.

Therefore, a need exists for a method and apparatus that provides for seamless payment for goods and/or services regardless of the type of payment and/or the type of proprietary transaction processing network.

BRIEF DESCRIPTION OF THE SEVERAL VIEWS OF THE DRAWINGS

FIG. 5 is a diagram of an example of a payables profile in accordance with the present invention;

FIG. 7 is a diagram of an example of creating payment data from a payables profile and an accounts payable data file in accordance with the present invention;

FIG. 9 is a schematic block diagram of an embodiment of a payment entity device in accordance with the present invention;

FIG. 10 is a state diagram of an embodiment of a method for reconciling and reporting payment of accounts payable in accordance with the present invention;

FIG. 13 is a logic diagram of an embodiment of a continuing method for reconciling and reporting payment of accounts payable in accordance with the present invention;

FIG. 14 is a logic diagram of an embodiment of a method for analyzing consolidated data and payment method programs in accordance with the present invention.

DETAILED DESCRIPTION OF THE INVENTION

Figure 1:
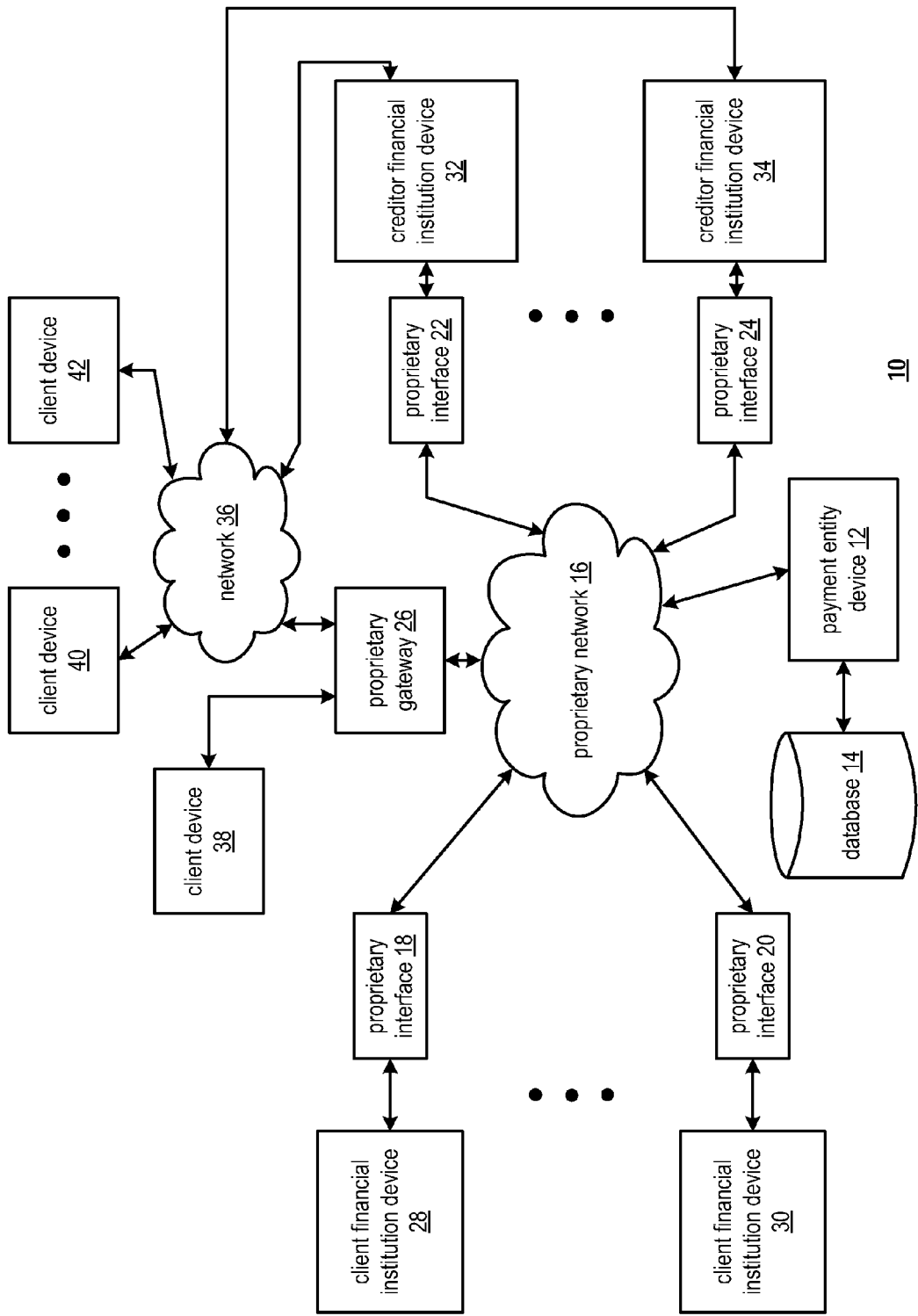
FIG. 1 is a schematic block diagram of an embodiment of a system in accordance with the present invention.

FIG. 1 is a schematic block diagram of an embodiment of a system 10 that includes a payment entity device 12, a database 14, a proprietary transaction processing network 16, a plurality of proprietary interfaces 18-24, a proprietary gateway 26, a plurality of client financial institution devices 28-30, a plurality of creditor financial institution devices 32-34, a network 36 (e.g., the internet), and a plurality of client devices 38-42.

The payment entity device 12, the database 14, and the proprietary network 16 may be operated and maintained by a single entity to facilitate seamless payment and reconciliation of accounts payable regardless of the payment method on behalf of one or more clients (e.g., individuals, businesses, agencies, and/or other entities). For example, Visa, Inc. may provide its VisaNet® as the proprietary network 16 and have one or more computing devices (e.g., computers, servers, super computers, main frames, etc.) coupled to the proprietary network 16 to function as the payment entity device 12, and may have one or more databases 14 coupled thereto.

In general, a client, via its device 38-42, establishes an account with the payment entity (e.g., Visa, Inc.), via its device 12. The account includes a level of service (basic, level 1, etc.), identity of the client and its device 38-42, and a payables profile. The payables profile includes a list of creditors (suppliers, merchants, service providers, etc.) of the client, identification information of the creditors, and one or more preferred methods of paying debt owed to a creditor.

With the account established, the payment entity is ready to provide payment and reconciliation support for the client. This function commences when the client, via its device 38-42, provides an accounts payable data file to the payment entity device 12 via the proprietary gateway 26 (and optionally the network 36) and the proprietary network 16. The proprietary gateway 26 is a proprietary node, modem, bridge, etc., that serves as a connection point to the proprietary network 16, which ensures that only authorized entities have access to the proprietary network 16. Note that communications within the system 10 occur in accordance with the communication protocol (e.g., internet protocol, transmission control protocol, and/or a proprietary version thereof) of the proprietary network 16.

Upon receiving the accounts payable data file, the payment entity device 12 retrieves the payables profile of the client, which may be stored in the database 14. The payment entity device 12 determines a method of payment (e.g., credit card [e.g., credit card, debit card, charge card, stored-value card, prepaid card, Electronic Benefit Transfer card, card account and other types of issued cards or accounts], funds transfer [e.g., wire transfer, account transfer within same financial institution, etc.], commercial paper [e.g., check, promissory note, etc.], tangible consideration [e.g., rebate, refund, goods and/or service exchange, etc.], debit account [e.g., ACH, line or credit, etc.], and credit card [e.g., business, debit card, auto pay, single use, etc.]), amount of payment, payment date, and terms of payment for each account payable in the accounts payable data file based on the payables profile. Alternatively, for an account payable, the payment entity device 12 may determine a different method of payment that is more optimal (e.g., less costly to process, better payment terms, rebate offer, rewards offer, etc.) for the client.

For a given account payable, the payment entity device 12 initiates a payment on behalf of the client in accordance with the method of payment, the amount of payment, the payment date, and the payment terms by sending a payment request to a client financial institution device 28-30 that corresponds to the type of payment (e.g., issuer bank for a credit card payment, a bank for check payment, a bank for wire transfer, etc., which may be the same or different banks).

The client financial institution device 28-30 processes the payment request in accordance with the type of payment. For example, if the type of method is a credit card payment, the client financial institution device 28-30 assists in the clearing and settlement process with the creditor's financial institution device 32-34. As another example, if the type of payment is a check, the client financial institution device 28-30 determines whether the client has sufficient funds in its account to cover the amount due. If yes, the client financial institution device 28-30 generates a check, sends it to the creditor, and generates a transaction completed message, which includes the check number, amount, creditor, payment date, etc. The client financial institution device 28-30 sends the transaction complete message to the payment entity device 12.

The payment entity device 12 monitors the payments of the accounts payable, collects the payment responses from the various financial institution devices 28-30 and 32-34, reconciles payments of the accounts payable, and generates reports thereof. As an example, the payment entity device 12 generates a client statement report that indicates how and when the accounts payable have been paid. In this manner, the client, after setting up an account, merely transmits an accounts payable data file to the payment entity device 12 and receives a statement when the accounts are paid, with little or no interaction to facilitate the payments regardless of the payment type.

Figure 2:
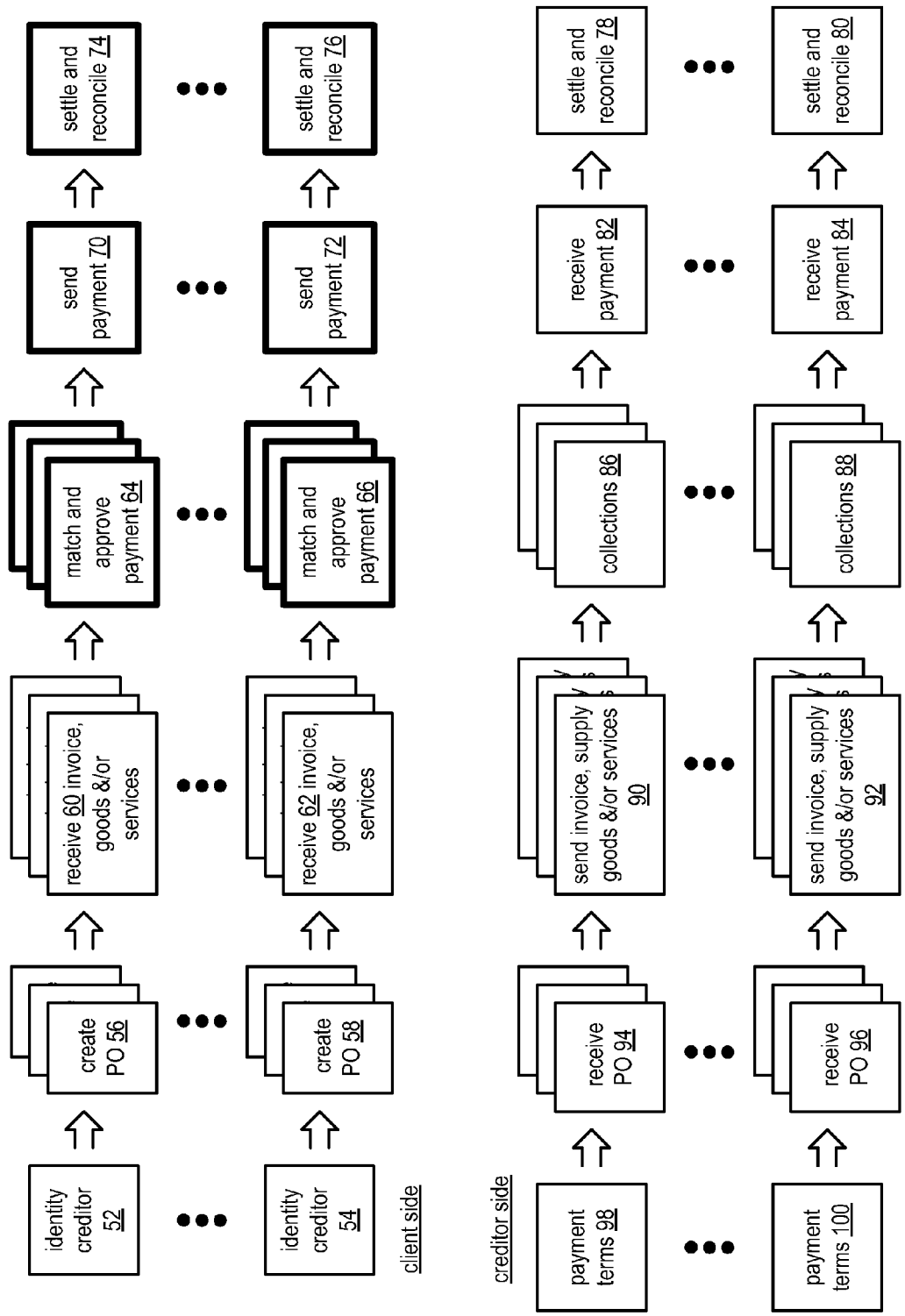
FIG. 2 is a diagram of an example of a payment and procurement process in accordance with the present invention.

FIG. 2 is a diagram of an example of a payment and procurement process that includes a client side and a creditor side. The client side includes identifying creditors (e.g., supplier, service provider, merchant, loan service, line of credit service, etc.) 52-54, creating purchase orders (PO) 56-58, receiving invoice for goods and/or services 60-62 per purchase order, match and approve payment 64-66 per purchase order, send payment 70-72 per purchase order or creditor, and settle and reconcile 74-76 each payment. The creditor side includes establish payment terms 98-100 for a client, receive purchase orders 94-96, send invoice for goods and/or services 90-92, generate collections (e.g., accounts receivable) 86-88, receive payments 82-84 for each purchase order or from a given client, and settle and reconcile payments 78-80. Note that the system of FIG. 1 supports the match and approve payment step 64-66, the send payment step 70-72, and/or the settle and reconcile step 74-76.

Figure 3:
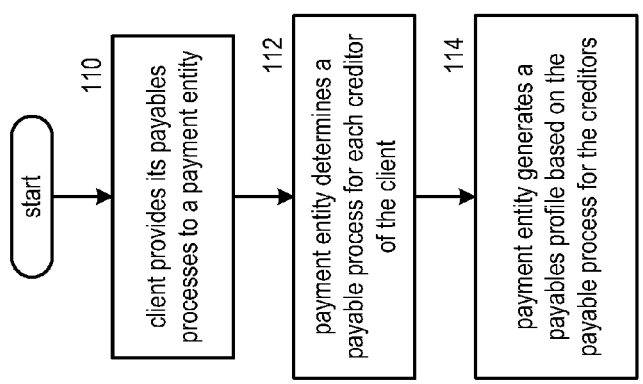
FIG. 3 is a logic diagram of an embodiment of a method for creating a payables profile in accordance with the present invention.

FIG. 3 is a logic diagram of an embodiment of a method for creating a payables profile that begins at step 110 where a client device 38-42 provides the client's payable processes to the payment entity device 12. The client's payables processes include identity of a creditor and, for each creditor, one or more preferred methods of payment (e.g., credit card, funds transfer, commercial paper, tangible consideration, debit account, and credit card), preferred payment terms, and identity of client's corresponding financial institution. Note that the client's payables processes may include more or less data. Further note that client's payables processes may include default information. For example, the default information may indicate a particular payment type for any non-specified creditor, may indicate a particular payment type for certain types of transactions regardless of creditor, may indicate a particular payment type for transactions greater than a certain value and another for transactions less than the certain value, may indicate, for a given payment type, to use a particular client financial institution, and/or may indicate to have the payment entity device to determine the payment method and/or client financial institution. As such, the client can provide as specific or as vague of guidelines as it desires as to how, when, and in what way its debts are to be paid.

The method then proceeds to step 112 where the payment entity determines a payables process for each creditor of the client based on the client's payables processes. For example, if the client provided a specific payables process for a specific creditor, then the payment entity stores this information for the specific creditor. As another example, if the client did not provide a specific payables process for a creditor, the payment entity may assign the default payment process or a payment entity identified payment process for the creditor. The method then proceeds to step 114 where the payment entity generates a payables profile for the client based on the payables processes for the creditors.

Figure 4:
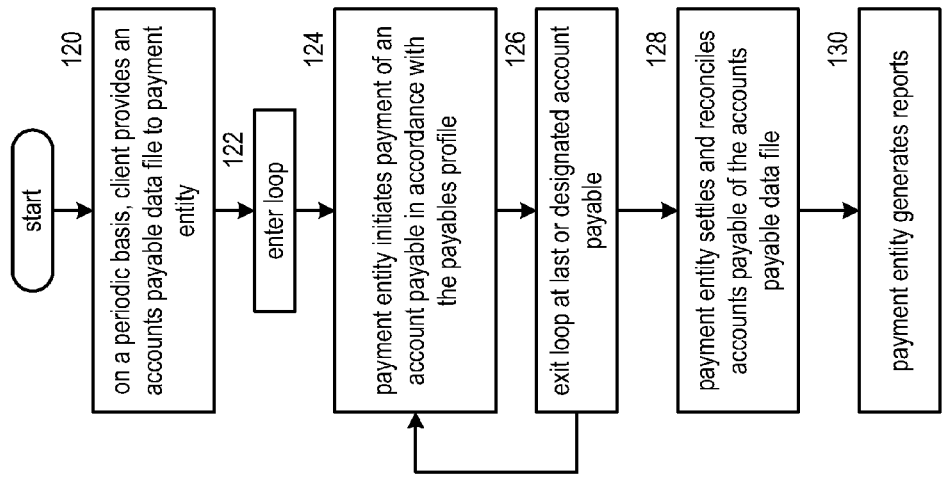
FIG. 4 is a logic diagram of an embodiment of a method for paying accounts payable in accordance with the present invention.

FIG. 4 is a logic diagram of an embodiment of a method for paying accounts payable that begins at step 120 where, on a periodic basis (e.g., weekly, bi-monthly, monthly, when initiated by the client), the client device 38-42 provides an accounts payable data file to the payment entity device 12. In an embodiment, the accounts payable data file includes, at a minimum, invoices from creditors of the client. The invoices may be arranged into a tabular form, or other form, and sorted based on creditor, item purchased, dollar amount, method of payment, and/or any other data point.

The method continues at step 122, where the payment entity device 12 enters a loop. Within the loop, the payment entity device 12 initiates a payment of an account payable in accordance with the payables profile at step 124. For example, for a given accounts payable, which may correspond to a single invoice from a given creditor or a group of invoices from the creditor, the payment entity device 12 accesses the payables profile with respect to the creditor. Based on the payment preferences specified in the payables profile, the payment entity device 12 generates a payment request and sends to the appropriate client financial institution. The payment entity device 12 remains in the loop unit the last or a designated account payable is reached at step 126. For example, the designated account payable may correspond to a cumulative total of payments being exceeded, a certain number of creditors, etc. Note that the payment initiation is being done without involvement of the creditor's financial institution as is typical in credit card transactions.

The method then continues at step 128 where the payment entity device settles and reconciles the accounts payable. For example, the payment entity device 12 receives payment notifications from the client's financial institutions, stores the payment notifications, and reconciles the payment notifications with the accounts payable. The method then continues at step 130 where the payment entity device 12 generates reports regarding the payment of the accounts payable. The payment entity device 12 may generate a report for the client, for itself, for the client's financial institution(s), and/or the creditor's financial institution(s).

FIG. 5 is a diagram of an example of a payables profile 140 that includes a plurality of fields. The fields may include more or less of a creditor field, an accounts payable type field, a payment method field, a payment terms field, and a financial institution field. In an embodiment, the payment entity device 12 stores, for the creditors of the client, the preferred payment method, payment terms, and financial institution for various types of accounts payable. The preferences may be provided by the client without input from the payment entity, may include input from the payment entity, or derived by the payment entity.

As shown for a given creditor, accounts payable may be grouped and have different payment preferences. For example, Supplier ABC has two groupings of accounts payable type: the first being any goods and/or services that have a purchase price greater than a specified price and goods in category 1. The specified price could be a per-item price or a cumulative price. For goods and/or services that exceed this price, the preferred payment method is a credit card, which should be paid net-30 from the date of an invoice, and to use one or more of the credit cards the client has that is/are issued from Bank "A".

For goods that fall into category 1 (e.g., office supplies, etc.), the preferred method of payment is a line of credit with Bank "A". In the case where goods of category 1 are purchased and exceed the price threshold, a hierarchical approach may be applied to determine which payment method to use. For example, in this instance, use the first preferred method.

For all other goods and/or services that are not within category 1 and have a price less than the threshold, the payment entity device 12 will use a default payment approach. The client may specify the default method or the payment entity device 12 may determine the default method.

As another example, Supplier B has indicated that all of its accounts payables are to be paid using a wire transfer, with payment terms it specifies in the account payable data file, and the funds should come from Bank "A". As yet another example, Supplier DEF has numerous account payable categories, each with a different payment preference. As shown, services of category 1 are to be paid using a debit account, services of category 2 are to be paid using a check, goods of category 1 are to be paid using a credit card, goods of category 2 are to be paid with tangible consideration (e.g., a credit, exchange of goods and/or services, etc.), and a loan payment is to be made using a wire transfer.

As a further example, Supplier D has two classifications for its accounts payable: one for accounts payable incurred between a first and second date and a second for accounts payable incurred subsequent to the second date. In this example, all accounts payable incurred between the first and second dates are to be paid using a promissory note from a venture capitalist (VC) "1". For accounts payable incurred after the second date, a credit card is to be used. Also, payments on the promissory note are to be made using a check from an account with Bank "B".

Figure 6:
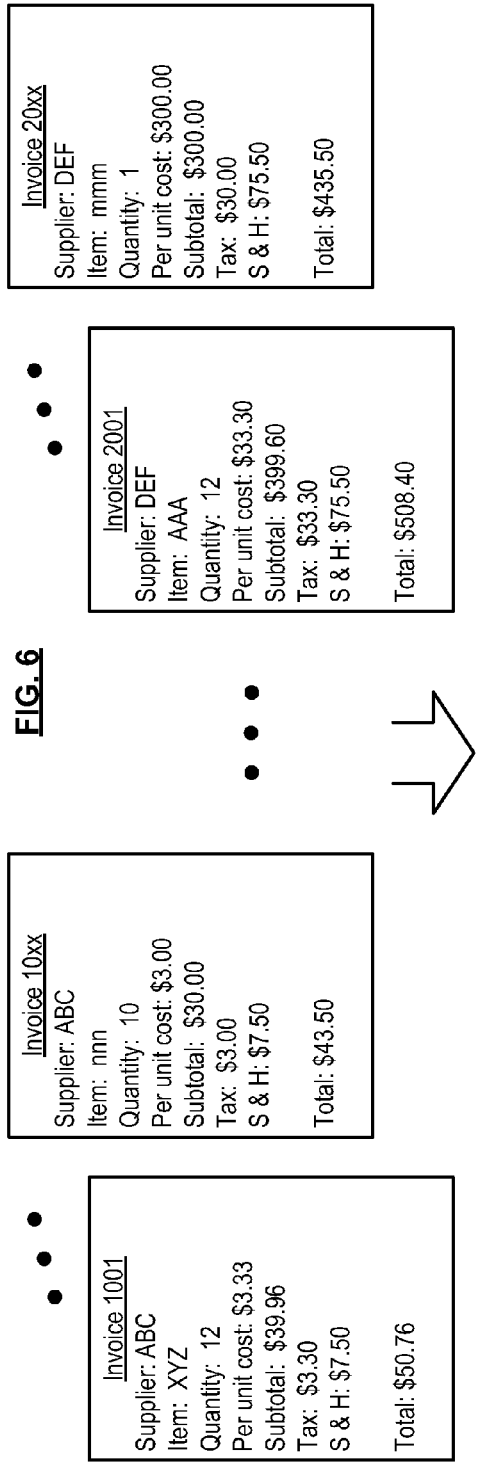
FIG. 6 is a diagram of an example of an accounts payable data file in accordance with the present invention.

FIG. 6 is a diagram of an example of an accounts payable data file 150 created from a plurality of invoices. In an embodiment, the invoices may stored and provided as the accounts payable data file 150. In another embodiment as shown, the invoices are tabulated to create the data file 150.

In this example, each invoice includes supplier identification information (e.g., name, address, creditor's financial institution, etc.), the items purchased, the quantity of items purchased, the unit cost of the items purchased, a subtotal, taxes, shipping and handling, and a total. On a per creditor basis, or some other basis (e.g., amount, item, etc.), the data is tabulated. In addition, the accounts payable data file may include an additional field to indicate with a particular account payable is to be paid in accordance with the payable profile or with an alternate payment process. In this example, invoice 2001 is to be paid using a check with a net-45 payment term.

FIG. 7 is a diagram of an example of creating payment data 152 from a payables profile 150 and an accounts payable data file 140 for a given creditor (e.g., supplier DEF). The payables profile 140 is a repeated from FIG. 5 for Supplier DEF and the account payable data file 150 is repeated from FIG. 6 for Supplier DEF with the addition of invoices 2002 and 2003. From these two data files, the payment entity device 12 generates the payment data 152, which is used to create payment requests that are sent to the appropriate financial institutions of the client.

For example, with respect to invoice 2001, the processing entity device 12 reviews the accounts payable data file 150 for this invoice to identify the invoice date, the item purchased, the purchase price, tax, shipping & handling, and if an alternate payment method is indicated. In this instance, there is an alternate payment method. As such, for invoice 2001, the payment entity device 12 generates the payment data to include the invoice number (e.g., 2001), the invoice date (e.g., Jan. 1, 2008), the item (e.g., AAA), the account payable type (e.g., Services—Category 1), the total price (e.g., $508.40, assuming tax and shipping & handling costs are being paid along with the purchase prices and not being paid using a different payment method), the payment method (e.g., check per the accounts payable file instead of a debit account as indicated in the payables profile), the payment terms (e.g., net 45 per the accounts payable data file), the financial institution identity (e.g., Bank "B" per the accounts payable data file instead of Bank "A" per the payables profile), and the payment date (e.g., Feb. 15, 2008, 45 days from the invoice date).

As another example, with respect to invoice 2002, the processing entity device 12 reviews the accounts payable data file 150 for the relevant information. In this instance, there is no alternate payment method. As such, for invoice 2002, the payment entity device 12 generates the payment data to include the invoice number (e.g., 2002), the invoice date (e.g., Jan. 2, 2008), the item (e.g., XXX), the account payable type (e.g., Services—Category 2), the total price (e.g., $50.76, assuming tax and shipping & handling costs are being paid along with the purchase prices and not being paid using a different payment method), the payment method (e.g., check per payables profile), the payment terms (e.g., net 30 per the payables profile), the financial institution identity (e.g., Bank "B" per the payables profile), and the payment date (e.g., Feb. 2, 2008, 30 days from the invoice date).

The payment entity device 12 generates the payment data 152 for invoice 2003 and 2004 in a similar manner as it generated the payment data 152 for invoice 2001. Note that since the payables profile and the accounts payable data file did not indicate payment terms for goods ZZZ purchase via invoice 2003, the payment entity device 12 initiates payment on a date it selects. In this example, the payment entity device 12 was programmed to select the date on which the data is compiled, however, it could be programmed to select any date or interval from the corresponding invoice date.

In this example, the payment entity device 12 also generates payment data 152 for a loan that the client has with Supplier DEF. The loan could be a line of credit, a loan, or some other form of monetary advancement. The payment data 152 for the loan indicates that $500.00 is to be wired from Bank "A" to Supplier DEF's account on the date the data is created.

Figure 8:
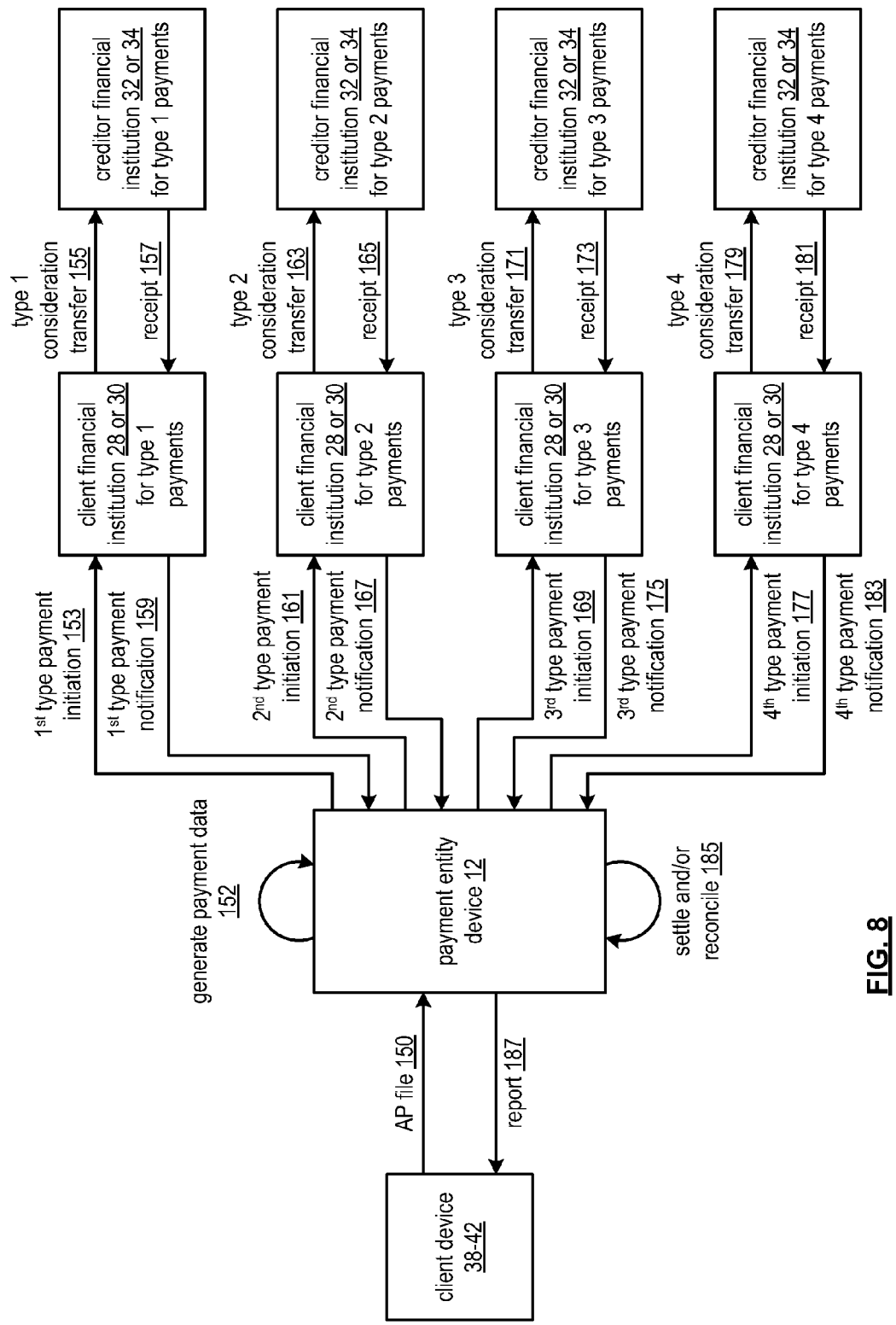
FIG. 8 is a schematic block diagram of an example of payment of accounts payable via a system in accordance with the present invention.

FIG. 8 is a schematic block diagram of an example of payment of accounts payable via the system 10 of FIG. 1. In this example, the client device 38-42 transmits an accounts payable data file 150 to the payment entity device 12. The payment entity device 12 processes the account payable data file 150 in accordance with the payables profile 140 for the client to generate the payment data 152.

The payment entity device 12 analyzes the payment data 152 on an per entry basis to determine a type of payment (e.g., credit card, funds transfer, commercial paper, tangible consideration, or debit account). When the type of payment is a first type, the payment entity device 12 transmits a $1^{st}$ type payment initiation request 153 to a client financial institution 28 or 30 that processes the $1^{st}$ type of payments. Assuming the payment is approved, the client financial institution 28 or 30 transfers the $1^{st}$ type of consideration 155 (e.g., funds transfer, check, line of credit, etc.) to a creditor financial institution 32 or 34 that processes the first type of payment. Upon crediting the $1^{st}$ type of consideration to the appropriate creditor's account, the creditor's financial institution 32 or 34 transmits a receipt of payment 157 to the client financial institution 28 or 30. The client financial institution 28 or 30 processes the receipt 157 to produce a $1^{st}$ type of payment notification 159. The client financial institution transmits the notification 159 to the payment entity device 12.

When the type of payment is a second type, the payment entity device 12 transmits a $2^{nd}$ type payment initiation request 161 to a client financial institution 28 or 30 that processes the $2^{nd}$ type of payments. Assuming the payment is approved, the client financial institution 28 or 30 transfers the $2^{nd}$ type of consideration 163 (e.g., funds transfer, check, line of credit, etc.) to a creditor financial institution 32 or 34 that processes the second type of payment. Upon crediting the $2^{nd}$ type of consideration to the appropriate creditor's account, the creditor's financial institution 32 or 34 transmits a receipt of payment 165 to the client financial institution 28 or 30. The client financial institution 28 or 30 processes the receipt 165 to produce a $2^{nd}$ type of payment notification 167. The client financial institution transmits the notification 167 to the payment entity device 12.

When the type of payment is a third type, the payment entity device 12 transmits a $3^{rd}$ type payment initiation request 169 to a client financial institution 28 or 30 that processes the $3^{rd}$ type of payments. Assuming the payment is approved, the client financial institution 28 or 30 transfers the $3^{rd}$ type of consideration 171 (e.g., funds transfer, check, line of credit, etc.) to a creditor financial institution 32 or 34 that processes the third type of payment. Upon crediting the $3^{rd}$ type of consideration 171 to the appropriate creditor's account, the creditor's financial institution 32 or 34 transmits a receipt of payment 173 to the client financial institution 28 or 30. The client financial institution 28 or 30 processes the receipt 173 to produce a $3^{rd}$ type of payment notification 175. The client financial institution transmits the notification 167 to the payment entity device 12.

When the type of payment is a fourth type, the payment entity device 12 transmits a $4^{th}$ type payment initiation request 177 to a client financial institution 28 or 30 that processes the $4^{th}$ type of payments. Assuming the payment is approved, the client financial institution 28 or 30 transfers the $4^{th}$ type of consideration 179 (e.g., funds transfer, check, line of credit, etc.) to a creditor financial institution 32 or 34 that processes the fourth type of payment. Upon crediting the $4^{th}$ type of consideration 179 to the appropriate creditor's account, the creditor's financial institution 32 or 34 transmits a receipt of payment 181 to the client financial institution 28 or 30. The client financial institution 28 or 30 processes the receipt 181 to produce a $4^{th}$ type of payment notification 183. The client financial institution transmits the notification 183 to the payment entity device 12. Note that the client financial institution that processes the first, second, third, and fourth types of payments may be the same financial institution, different institutions, or multiple financial institutions with at least one processing at least two types of payments. For example, a client may have a checking account and credit card with a first bank and having a line of credit and a debit account from a second bank.

As the payment entity device 12 receives the notifications 159, 167, 175, and/or 183, it stores them and processes 185 them to settle and reconcile the accounts payable. When this process is complete, or at any desired level of completion (e.g., on a per accounts payable basis up to all of the accounts payable in the accounts payable data file 150), the payment entity device 12 generates a report 187 regarding payment of the accounts payable and sends it to the client device 38-42. In such a system, the client sends its accounts payable information to the payment entity, which handles the payment, tracking, and reporting of paying the accounts payable with little or no further involvement of the client.

FIG. 9 is a schematic block diagram of an embodiment of a payment device 12 that includes a processing module 160, memory 162, an input interface 164, and an output interface 166. In an embodiment, the payment entity device 12 is a computer or similar processing device. In such an embodiment, the processing module 160 includes a central processing unit; the memory 162 includes system memory, cache memory, and read only memory; the input interface 164 includes a graphical user interface and/or a peripheral device interface (e.g., to connect to a mouse, a keyboard, etc.); and the output interface 166 includes a video card, printer card, etc. Note that, while not shown, the payment entity device 12 includes a network interface module such that it can access the proprietary network 16.

In general, the processing module 160 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 160 may have internal memory and/or is coupled to memory 162. Memory 162 and internal memory may each be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the internal memory and/or memory 162 stores, and the processing module 160 executes, hard coded and/or operational instructions corresponding to at least some of the steps and/or functions illustrated in FIGS. 1-14.

FIG. 10 is a state diagram of an embodiment of a method for reconciling and reporting payment of accounts payable that begins with the payment entity device in an idle state 170. The payment entity device transitions to a store payment request data state 176 as it receives payment request data, which includes one or more of updates to the payables profile and the accounts payable data file. In an embodiment, the payment request data will be received on a regular basis (e.g., weekly, bimonthly, monthly, on a specific date or dates, etc.) for initiating payment of accounts payable of a client. An example of a payables profile is discussed with reference to FIG. 5 and an example of an accounts payable data file is discussed with reference to FIG. 6. After the payment entity device has stored the payment request data, it transitions back to the idle state 170.

The payment entity device processes the accounts payable data file in accordance with the payables profile and updates thereto to initiate payments of the accounts payable. The payments may be made using any one of a plurality of methods. The methods include two or more of commercial paper (e.g., a check, a promissory note, etc.), a funds transfer (e.g., a wire transfer, an account to account transfer, etc.), tangible consideration (e.g., rebates, credit, loan payment, etc.), a debit account (e.g., an ACH account), and a credit card (e.g., debit card, prepaid card, conventional card, business card, elite card, etc.).

As the payment entity device receives remittance information from one or more of a plurality of financial institutions that process the payment of an account payable in accordance with the payment request, it transitions to the store remittance information 174. In this state, the payment entity device stores remittance data for each accounts payable of the payment request data stored in state 176. The remittance data may include one of more of: identification of the creditor's account number, identification of the creditor's financial institution, identification of the creditor, identification of the account payable (e.g., the invoice number, a tracking number, etc.), the amount paid, the method of payment, the goods and/or services purchased, the payment date, payment routing information, and/or any other information regarding making the payment.

After storing the remittance data for an accounts payable, the payment entity device transitions back to the idle state 170. The payment entity device will transition between the idle state 170 and the store remittance information state 174 until it has stored remittance information for each of the accounts payable of the payment request data, until a certain time period has elapsed, until an input to analyze data is received, or some other trigger is identified causing the payment entity to transition to the consolidated data state 178.

In addition to storing payment request data and remittance information, the payment entity device may periodically transition (synchronously or asynchronously with receiving of the payment request data) into a store payment method program state 172. In this state, the payment entity device communicates with a plurality of financial institutions to acquire new, modified, or deleted payment programs they are offering. For each new, modified, or deleted payment program, the payment entity device updates its list of payment method programs.

In state 178, the payment entity device consolidates the payment request data and the remittance data. In an embodiment, the consolidation includes reconciling each accounts payable of the payment request data with the corresponding remittance data. For example, an account payable includes: creditor AA, creditor AA's account number, goods XX, total cost of goods of $100.00, an invoice number, and an invoice date and the payables profile for this creditor includes a pay by wire transfer indication, pay net 30, and identifies the financial institution BB to execute the payment. Reconciliation of this account payable will be to identify the remittance information and verify that the remittance information matches the account payable information in accordance with payables profile. In particular, for this example, the payment entity device verifies that the remittance information includes the identify of creditor AA, creditor AA's account number, identity goods XX (optional), amount paid is $100.00, payment was made by wire transfer, a payment date, an invoice number, and identity of the financial institution BB.

Once the payment entity device consolidates the payment request data with the remittance information for a given account payable, it transitions to the store the consolidated data state 180. In this state 180, the payment entity device stores the consolidated data for the given account payable in a data file corresponding to the client. The payment entity device transitions back and forth between states 178 and 180 until it has consolidated the payment request data and the remittance information for each account payable or until a designated account payable is reached (e.g., a particular number has been processed, a predetermined period of time has elapsed since receiving the accounts payable data file, etc.). When this condition is met, the payment entity device transitions back to the idle state 170.

The payment entity device transitions to the analyze consolidated data state 182 in response to an analyze data command. The command may be automatically generated in response to transitions from state 180 back to the idle state 170 or in response to receiving an input from a user of the payment entity device to commence analysis. In state 182, the payment entity device analyzes the consolidated data to generate one or more reports and/or to make recommendations. When the payment entity device is directed to analyze the consolidated data for report generating, it determines whether an account payable has been consolidated with the remittance information, whether the account payable was paid using the payment scheme (e.g., payment method, payment due date, financial institution, payment terms, etc.) indicated in the payables profile or was paid using an alternate payment scheme, and/or any other specific reporting requirements of the client, payment entity, financial institution, and/or creditor.

After analyzing the consolidated data for generating one or more reports, the payment entity device transitions to generate reconciled client report state 184. In this state, the payment entity device generates a reconciled report for the client for each account payable of the current account payables data file. The formatting of the report may be a default format (e.g., in accordance with standard accounting practices) or customized as requested by the client. For example, the client may have a non-conventional account software program that requires a specific format. In an embodiment, the reconciled report is an account statement of the client for the given payment period.

In addition to generating the reconciled report, the payment entity device may generate a number of additional reports per client requests. For example, the payment entity device may generate a reconciled report regarding a particular creditor, regarding a particular type of goods and/or services, regarding a particular payment method, regarding a particular financial institution, regarding a particular payment program, etc. Having generated one or more reports for the client, the payment entity device transmits the report or reports to the client device and transitions to another state. Note that the transmission will be in accordance with the communication protocol of the proprietary network.

If an alternate payment scheme was used for one or more accounts payable, the payment entity device transitions to generate client alternate payment report state 186. In this state, the payment entity device identifies each account payable that was paid using a different payment scheme than indicated in the payables profile or in the updated payables profile provided by the client device. In this instance, during the payment process, the payment entity device identified and used a more optimal payment scheme (e.g., lower transaction fee, better interest rate, better payment terms, better bonuses, better rewards, etc.) than the payment scheme indicated in the payables profile. The report may include identification of the more optimal payment scheme, the payment scheme of the payables profile, terms of the more optimal payment scheme, and an explanation of why the more optimal payment scheme is more optimal. Once the alternate payment report is generated, the payment entity device transmits it to the client device and transitions to a next state.

If the payment entity device is to generate a payment entity report, it transitions to generate a reconciled payment entity report state 190. In this state, the payment entity device generates a report or reports for the payment entity, which may be individual client centric or for a plurality of clients. Such a report may be for a particular payment period and include identity of the client or clients, the payment period, a number of transactions processed, the payment schemes of the transactions, the payment entity's associated fee for each transaction, other transactional fees (e.g., financial institution fees), a list of creditors, a list of financial institutions executing the payments, etc. Once this report(s) is complete, it is stored and the payment entity device transitions to the next state.

If the payment entity device is to generate a financial institution report, it transitions to generate reconciled financial institution report state 191. In this state, the payment entity device generates a report or reports for a financial institution that executed one or more payments during a particular payment period. The report or reports may be for an individual client or for a plurality of clients. Such a report may be for the particular payment period and include identity of the client or clients, the payment period, a number of transactions processed, the payment schemes of the transactions, the financial institution's associated fee for each transaction, a list of creditors, etc. Once this report(s) is complete, the payment entity device transmits it to one or more financial institution devices and transitions to a next state.

If the payment entity device is to generate a creditor report, it transitions to generate reconciled creditor report state 188. In this state, the payment entity device generates a report or reports for a creditor that received one or more payments during a particular payment period. The report or reports may be for an individual client or a plurality of clients. Such a report may include identity of the client or clients, a list of account receivable per client, the payment period, a number of transactions processed, the payment schemes of the transactions, the payment amount for each account receivable, a list of financial institutions, etc. Once this report(s) is complete, the payment entity device transmits it to one or more creditor devices and transitions to the idle state 170.

If, in state 182, the payment entity device is directed to analyze the consolidated data for making recommendations, the payment entity device analyzes the current consolidated data and/or prior payment period consolidated data for one or a plurality of clients, for one or a plurality of creditors, and/or for one or a plurality of financial institutions. In this state, the payment entity device is analyzes the data to determine frequency of use of payment schemes, percentage of use of payment schemes, client spending trends, cost of goods and/or services per client, associated transactional fees of the payment schemes, comparison of payment schemes, comparison of goods and/or services offered by creditors, comparison of financial institutions, transaction volume breakdowns for creditors, clients, goods and/or services, payment schemes, etc. Once the data is analyzed, the payment entity device transitions to generate recommended alternate payment report for a client state 192.

In state 192, the payment entity device generates a recommended alternate payment report for a client. Such a report may recommend using a particular payment scheme for a particular creditor; using a particular payment scheme for a particular type of goods and/or services; using a particular financial institution for a particular payment method (e.g., use bank A for credit card purchases and bank B for checks), using a particular payment method from a particular financial institution; using a particular creditor for purchasing a particular type of goods and/or services; shifting payment methods to obtain volume discounts and/or to avoid excess use charges, etc. The payment entity device may further generate reports to assist clients with inventory tracking, purchase lead times, shipping methods, tax consequences, etc. Once this report(s) is complete, the payment entity device transmits it to one or more client devices and transitions to a next state.

If the payment entity device is to generate a creditor recommendation report, it transitions to generate recommended creditor report state 194. In this state, the payment entity device generates a recommended payment offer report or reports for a creditor. Such a report may recommend requesting a client to use a particular payment scheme; requesting use of a particular payment scheme for selling a particular type of goods and/or services; affiliating with a particular financial institution for a particular payment method (e.g., bank A for credit card purchases and bank B for checks), requesting use of specific payment methods to offer volume discounts and/or to avoid excess use charges, etc. The payment entity device may further generate reports to assist creditors in anticipating a client's purchasing needs, a client's purchase lead times, shipping methods, tax consequences, etc. Once this report(s) is complete, the payment entity device transmits it to one or more client devices and transitions to a next state.

If the payment entity device is to generate a financial recommendation report, it transitions to generate recommended financial report state 196. In this state, the payment entity device generates a recommended payment offer report or reports for a financial institution. Such a report may recommend: to request a client use a particular payment scheme; to develop a new payment scheme, to alter the transaction fees and/or other features of a particular payment scheme; to request a client to use a particular payment scheme for selling a particular type of goods and/or services; affiliating with a particular creditor for a particular payment method (e.g., creditor A for credit card purchases and creditor B for checks), to request use of specific payment methods to offer volume discounts and/or to avoid excess use charges, etc. The payment entity device may further generate reports to assist financial institutions in anticipating a client's financial needs, tax consequences, etc. Once this report(s) is complete, the payment entity device transmits it to one or more client devices and transitions to the state 170.

Figure 11:
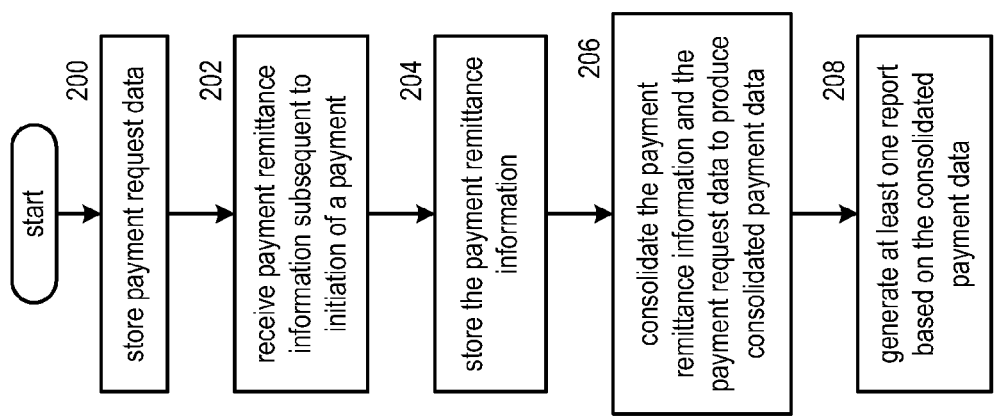
FIG. 11 is a logic diagram of an embodiment of a method for reconciling and reporting payment of accounts payable in accordance with the present invention.

FIG. 11 is a logic diagram of an embodiment of a method for reconciling and reporting payment of accounts payable that begins at step 200 where the payment entity device stores payment request data. In an embodiment, the payment request data includes at least one of updates to a payables profile and an accounts payable data file for a given client. The method then continues at step 202 where the payment entity device receives payment remittance information subsequent to initiation of a payment in accordance with the payment request data.

The method continues at step 204 where the payment entity device stores the payment remittance information. The remittance data may include one of more of: identification of the creditor's account number, identification of the creditor's financial institution, identification of the creditor, identification of the account payable (e.g., the invoice number, a tracking number, etc.), the amount paid, the method of payment, the goods and/or services purchased, the payment date, payment routing information, and/or any other information regarding making the payment.

The method continues at step 206 where the payment entity device consolidates the payment remittance information and the payment request data to produce consolidated payment data. An embodiment of this step will be further discussed with reference to FIG. 12. The method continues at step 208 where the payment entity device generates at least one report based on the consolidated payment data. This may be done as described in states 182-196 of FIG. 10.

Figure 12:
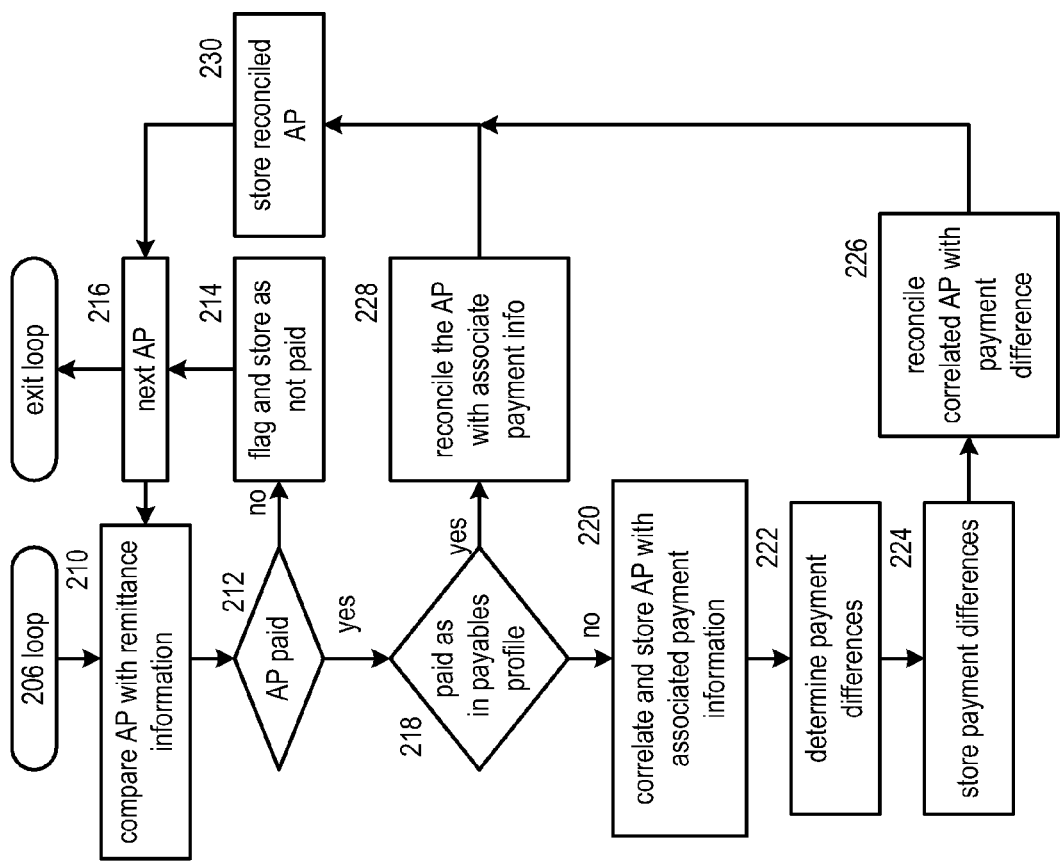
FIG. 12 is a logic diagram of an embodiment of a method for reconciling payment of accounts payable in accordance with the present invention.

FIG. 12 is a logic diagram of an embodiment of a method for reconciling payment of accounts payable per step 206 of the method of FIG. 11. This method begins with the payment entity device enters a loop. Within the loop, the payment entity device compares an account payable of the accounts payable data file with the remittance information. The method continues at step 210 where the payment entity device determines whether the account payable has been paid. This may be done by identifying remittance data for the corresponding account payable.

If the account payable was not paid, the method continues at step 214 where the payment entity device flags and stores, as a non-reconciled account payable, the account payable as not being paid. This may result if the consolidation is taking place prior to payment of the account payable. For example, if the consolidation process is executed every month, but an account payable has a net 45 payment term, the payment may not be executed before the consolidation is performed. In this example, the payment entity flags this account payable for the next time the consolidation is performed and reports the same. If, however, a payment was expected prior to the execution of the consolidation and was not made, then the account payable is flagged with an error and a reason for non-payment (e.g., insufficient funds). This may be done in addition to, or in lieu of, any other notifications for non-payment of an account. The method continues at step 216 where the payment entity repeats the loop for the next account payable or exits the loop when the last or a designated (e.g., a certain number has been reached, etc) account payable is reached.

If, at step 212, the payment entity device determines that an item in the remittance data compares favorably with the account payable (i.e., the account payable was paid), the payment entity device determines whether the account payable was paid in accordance with the payables profile. If so, the method continues at step 228 where the payment entity device reconciles the account payable with the associated payment information. For example, an account payable includes: creditor AA, creditor AA's account number, goods XX, total cost of goods of $100.00, an invoice number, and an invoice date and the payables profile for this creditor includes a pay by wire transfer indication, pay net 30, and identifies the financial institution BB to execute the payment. Reconciliation of this account payable will be to verify that the remittance information matches the account payable information in accordance with payables profile. In particular, for this example, the payment entity device verifies that the remittance information includes the identify of creditor AA, creditor AA's account number, identity goods XX (optional), amount paid is $100.00, payment was made by wire transfer, a payment date, an invoice number, and identity of the financial institution BB. The method continues at step 230 where the payment entity device stores the reconciled account payable and then proceeds to step 216.

If, at step 218, the accounts payable was not made in accordance with the payables profile (e.g., the payment entity device initiated payment using a more optimal payment scheme), the method continues at step 220. At step 220, the payment entity device correlates the account payable with the item in the remittance information to produce a correlated account payable and stores it as correlated account payable. The method continues at step 222 where the payment entity device determines a payment difference between the correlated account payable and the payables profile. The method continues at step 224 where the payment entity device stores the payment difference. The method continues at step 226 where the payment entity device reconciles the payment difference with the correlated account payable to produce the reconciled account payable. The method then continues at step 230 where the payment entity device stores the reconciled accounts payable and then proceeds to step 216.

As an example of steps 220-226, assume that an account payable includes: creditor AA, creditor AA's account number, goods XX, total cost of goods of $100.00, an invoice number, and an invoice date and the payables profile for this creditor includes a pay by wire transfer indication, pay net 30, and identifies the financial institution BB to execute the payment. The corresponding remittance information includes the identify of creditor AA, creditor AA's account number, identity goods XX (optional), amount paid is $100.00, payment was made by check, a payment date, an invoice number, and identity of the financial institution CC. In this example, the amount owed the creditor was paid by check via financial institution CC instead of by a wire transfer via financial institution BB. The payment entity device stores the differences for subsequent reporting and reconciles payment using the check by financial institution CC to create the reconciled account payable.

FIG. 13 is a logic diagram of an embodiment of a continuing method for reconciling and reporting payment of accounts payable that begins at step 240 where the payment entity device stores a plurality of payment method programs from a plurality of financial institutions. In an embodiment, a payment method program includes at least some of: identity of at least one financial institution, at least one payment method (e.g., credit card, a funds transfer, commercial paper, tangible consideration, and a debit account), at least one associated processing fee, and at least one associated offer.

The method continues at step 242 where the payment entity device analyzes the consolidated data with reference to the plurality of payment method programs. An embodiment of the analysis will be described with reference to FIG. 14. The method continues at step 244 where the payment entity device determines whether one or more of the payment method offers provides a more optimal payment solution for a given creditor in the payables profile that the current payment scheme of the payables profile. If yes, the method continues at step 246 where the payment entity device generates, for a client, a recommended alternative payment method report. A payment method may be more optimal if it offers lower transactions fees, lower interest rates, better payment terms, lower purchase price from a different creditor, volume discounts from a creditor, etc. An example of such a report was described with reference to FIG. 10.

The method continues at step 248 where the payment entity device determines, for a financial institution, whether the analysis of step 242 identifies a payment method option regarding at least one of: one or more of a plurality of clients, a volume of transactions, an amount of a transaction, terms of payment, and one or more of a plurality of creditors that is favorable to one or more payment methods offered by the financial institution. If yes, the payment entity device generates a recommended payment method program report for the financial institution at step 250. An example of such a report was described with reference to FIG. 10.

The method continues at step 252 where the payment entity device determines, for a creditor, whether the analysis of step 242 identifies a payment method option regarding at least one of: the creditor's financial institution, client spending trends, the one or more of the plurality of clients, a volume of transactions with the one or more of the plurality of clients, the amount of a transaction, and the terms of payment. If yes, the method continues at step 254 where the payment entity device generates a recommended payment offer report for the creditor. An example of such a report was described with reference to FIG. 10. If the analysis does not lead to such a report, the method proceeds to step 256 where no reports are generated.

FIG. 14 is a logic diagram of an embodiment of a method for analyzing consolidated data and payment method programs per step 242 of FIG. 13. The method begins with the payment entity device entering a loop. Within the loop, the method continues at step 260 where the payment entity device compares at least one payment method of an account payable of the accounts payable data file with the plurality of payment method programs. The method branches at step 262 to step 264 when at least one of the plurality of payment method programs compares favorably to the at least one payment method and to step 266 when it does not. At step 264, the payment entity device compiles and stores the at least one of the plurality of payment method programs in an options list.

An example of this was provided with reference to FIG. 10. The method then continues at step 266 where the payment entity device continues with the next account payable or exits the loop.

Figure 15:
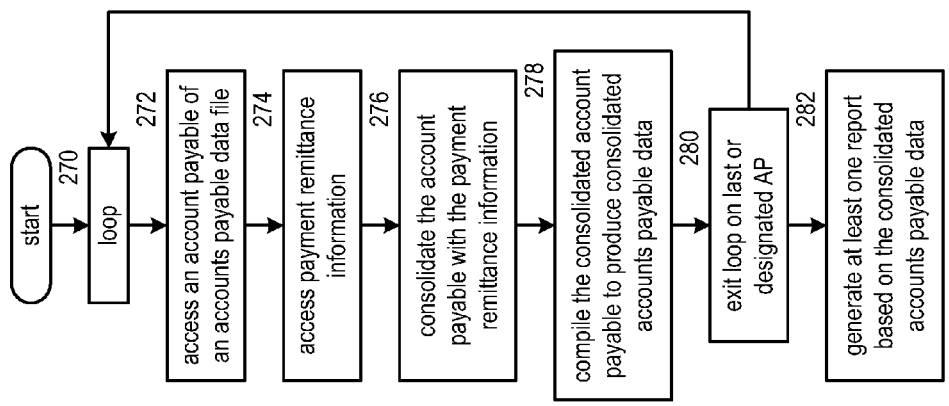
FIG. 15 is a logic diagram of another embodiment of a method for reconciling and reporting payment of accounts payable in accordance with the present invention.

FIG. 15 is a logic diagram of another embodiment of a method for reconciling and reporting payment of accounts payable that begins at step 270 where the payment entity device enters a loop. Within the loop, the method continues at step 272 where the payment entity device accesses an account payable of an accounts payable data file. The method continues at step 274 where the payment entity device accesses payment remittance information. The method continues at step 276 where the payment entity device consolidates the account payable with the payment remittance information to produce a consolidated account payable.

The method continues at step 278 where the payment entity device compiles the consolidated account payable to produce consolidated accounts payable data. The method continues at step 280 where the payment entity device repeats the loop for the next account payable or exits the loop. Upon exiting the loop, the method continues at step 282 where the payment entity device generates at least one report based on the consolidated accounts payable data.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method comprising:
receiving, from a client device that is operated by a client that pays a plurality of creditors, an accounts payable data file, wherein the accounts payable data file includes a plurality of accounts payable entries, and wherein each of the plurality of accounts payable entries has associated creditor information and a payment amount;
determining, by a payment entity device that is configured to facilitate payment and reconciliation of accounts payable, a payment scheme for each of the plurality of accounts payable entries in response to the accounts payable data file and a payables profile for the client;
initiating payment transactions by the payment entity device for the plurality of accounts payable entries in the accounts payable data file in accordance with the payment schemes associated therewith, wherein the payment schemes include two or more of: a business credit card, a funds transfer, commercial paper, monetary consideration such as a rebate, refund, or exchange, and a debit account;
receiving payment remittance information by the payment entity device in response to the initiated payment transactions;
storing the payment remittance information by the payment entity device;
consolidating by the payment entity device the payment remittance information and the accounts payable data file to produce consolidated payment data, wherein the consolidating the payment remittance information and the accounts payable data file comprises entering a loop, the loop including:
comparing one of the accounts payable entries of the accounts payable data file with the remittance information;
determining that an item in the remittance information compares favorably with the accounts payable entry;
determining that the accounts payable entry was paid in accordance with the payables profile, and reconciling the accounts payable entry with the item in the remittance data to produce a reconciled account payable;
storing the reconciled account payable;
proceeding to a next accounts payable entry of the accounts payable data file; and exiting the loop when a last or other designated accounts payable entry of the accounts payable data file is reached;

generating by the payment entity device a report for each of the plurality of accounts payable entries based on the consolidated payment data; and transmitting the report by the payment entity device to the client device.

2. The method of claim 1 further comprising:

storing a plurality of payment method programs from a plurality of financial institutions, wherein a payment method program of the plurality of payment methods includes at least some of: identity of at least one of the plurality of financial institutions, at least one payment method, at least one associated processing fee for the at least one payment method, and at least one associated offer for the at least one payment method, wherein the at least one payment method includes one or more of credit card, a funds transfer, commercial paper, tangible consideration, and a debit account.

3. The method of claim 2 further comprising:

analyzing the consolidated data with reference to the plurality of payment method programs; and further includes at least one of:

with respect to the client, when the analyzing identifies a payment method option regarding at least one of: one or more account payables, transaction amount, a creditor, alternate creditor for service or goods, payment terms, and a creditor's financial institution that is favorable to the payment scheme for one of the plurality of accounts payable entries in the accounts payable data file, generating a recommended alternative payment method report;

with respect to a financial institution of the plurality of financial institutions, when the analyzing identifies a payment method option regarding at least one of: one or more of a plurality of clients, a volume of transactions, an amount of a transaction, terms of payment, and one or more of a plurality of creditors that is favorable to one or more payment methods offered by the financial institution, generating a recommended payment method program report; and with respect to the creditor, when the analyzing identifies a payment method option regarding at least one of: the creditor's financial institution, client spending trends, the one or more of the plurality of clients, a volume of transactions with the one or more of the plurality of clients, the amount of a transaction, and the terms of payment, generating a recommended payment offer report.

4. The method of claim 3, wherein the analyzing comprises:

entering a loop, the loop including:

comparing at least one of the payment schemes for one of the plurality of accounts payable entries in the accounts payable data file with the plurality of payment method programs;

when at least one of the plurality of payment method programs compares favorably to the at least one payment scheme, compiling the at least one of the plurality of payment method programs in an options list;

proceeding to a next account payable entry of the accounts payable data file;

exiting the loop when a last or other designated account payable of the accounts payable data file is reached.

5. The method of claim 1, wherein the generating the report comprises at least one of:

generating a reconciled client payment report;

generating a reconciled payment entity payment report;

generating a reconciled financial institution payment report;

generating a reconciled creditor payment report; and generating a client alternate payment method report, wherein the alternate payment method report identifies at least one accounts payable entry of the accounts payable data file that was paid using a payment method that differed from a payment method indicated in the payables profile.

6. The method of claim 1 further comprising:

when the item in the remittance data compares unfavorably with the accounts payable entry, flagging the account payable as not paid to produce a non-reconciled account payable; and storing the non-reconciled account payable.

7. The method of claim 1, wherein the consolidating the payment remittance information and the accounts payable data file further comprises:

determining that an accounts payable entry was not paid in accordance with the payables profile, and correlating the accounts payable entry with the item in the remittance information to produce a correlated account payable;

storing the correlated account payable;

determining a payment difference between the correlated account payable and the payables profile;

storing the payment difference; and reconciling the payment difference with the correlated account payable to produce the reconciled account payable.

8. The method of claim 1, wherein at least a portion of the payment remittance information is received from a financial institution associated with a creditor.

9. The method of claim 8, wherein the at least a portion of the remittance data includes: identification of the creditor, identification of the financial institution associated with the creditor, identification of a financial account number associated with the creditor, the amount paid, the method of payment, and payment routing information.

10. The method of claim 1, wherein the payment entity device is part of a proprietary payment network.

11. A method comprising:

accessing an accounts payable data by a payment entity device that is configured to facilitate payment and reconciliation of accounts payable, wherein the accounts payable data file includes a plurality of accounts payable entries and wherein each of the plurality of accounts payable entries has associated creditor information and a payment amount;

initiating payment transactions by the payment entity device for the plurality of accounts payable entries in the accounts payable data file in accordance with a payment scheme associated therewith, wherein the payment scheme includes two or more of: a business credit card, a funds transfer, commercial paper, monetary consideration such as a rebate, refund, or exchange, and a debit account;

accessing payment remittance information of the initiated payment transactions and accessing the accounts payable data file by the payment entity device;

consolidating the accounts payable data file with the payment remittance information to produce a consolidated account payable by the payment entity device that includes a determination of the payment remittance information for each of the respective accounts payable, wherein the determination indicates whether the account payable was paid in accordance with the payables profile, and wherein the consolidating the accounts payable data file with the payment remittance information to produce a consolidated account payable comprises:

comparing the accounts payable entries of the accounts payable data file with the remittance information;

determining that an item in the remittance information compares favorably with one of the accounts payable entries;

determining that the one of the accounts payable entries was paid in accordance with the payables profile, and reconciling the one of the accounts payable entries with the item in the remittance data to produce a reconciled account payable;

storing the reconciled account payable as the consolidated account payable;

determining that an accounts payable entry was not paid in accordance with the payables profile, and flagging the account payable as not paid to produce a non-reconciled account payable; and storing the non-reconciled account payable;

compiling the consolidated account payable by the payment entity device to produce a consolidated accounts payable data;

generating by the payment entity device a report for each of the plurality of accounts payable entries based on the consolidated accounts payable data, and transmitting the report by the payment entity device to a client device operated by a client that pays a plurality of creditors.

12. The method of claim 11 further comprising:

analyzing the consolidated accounts payable data with reference to a plurality of payment method programs, wherein the analyzing includes:

with respect to the client, when the analyzing identifies a payment method option regarding at least one of: one or more account payables, transaction amount, a creditor, alternate creditor for service or goods, payment terms, and a creditor's financial institution that is favorable to the payment scheme for one of the plurality of accounts payable entries in the accounts payable data file, generating a recommended alternative payment method report;

with respect to a financial institution of the plurality of financial institutions, when the analyzing identifies a payment method option regarding at least one of: one or more of a plurality of clients, a volume of transactions, an amount of a transaction, terms of payment, and one or more of a plurality of creditors that is favorable to one or more payment methods offered by the financial institution, generating a recommended payment method program report; and with respect to the creditor, when the analyzing identifies a payment method option regarding at least one of: the creditor's financial institution, client spending trends, the one or more of the plurality of clients, a volume of transactions with the one or more of the plurality of clients, the amount of a transaction, and the terms of payment, generating a recommended payment offer report.

13. The method of claim 11, wherein the generating the report comprises:

generating a reconciled client payment report;

generating a reconciled payment entity payment report;

generating a reconciled financial institution payment report;

generating a reconciled creditor payment report; and generating a client alternate payment method report, wherein the alternate payment method report identifies at least one accounts payable entry of the accounts payable data file that was paid using a payment method that differed from a payment method indicated in the payables profile.

14. The method of claim 11 further comprising:

when the one of the accounts payable entries was not paid in accordance with the payables profile, correlating the one of the accounts payable entries with the item in the remittance information to produce a correlated account payable;

storing the correlated account payable;

determining a payment difference between the correlated account payable and the payables profile;

storing the payment difference; and reconciling the payment difference with the correlated account payable to produce the reconciled account payable.

15. An apparatus comprising:

a processing module; and memory coupled to the processing module, wherein the processing module functions, at least partially based on operational instructions stored in the memory, to:

store payment request data for a client that pays a plurality of creditors, wherein the payment request data includes an accounts payable data file, wherein the accounts payable data file includes a plurality of accounts payable, and wherein each of the plurality of accounts payable has associated creditor information and a payment amount;

initiate a plurality of payment transactions for the plurality of accounts payable in the accounts payable data file in accordance with a payment scheme associated with each of the plurality of accounts payable, wherein the payment schemes include two or more of: a business credit card, a funds transfer, commercial paper, monetary consideration such as a rebate, refund, or exchange, and a debit account;

receive payment remittance information for the plurality of payment transactions in response to initiation of the plurality of payments;

store the payment remittance information such that the stored information includes a determination if the payment remittance information for each of the respective accounts payable indicates that the account payable was paid in accordance with the payables profile;

consolidate the payment remittance information and the payment request data to produce consolidated payment data, wherein the processing module further functions to consolidate the payment remittance information and the payment request data by entering a loop, the loop including:

comparing an account payable of the accounts payable data file with the remittance information;

determining that an item in the remittance information compares favorably with the account payable;

determining that the account payable was paid in accordance with the payables profile, and reconciling the account payable with the item in the remittance data to produce a reconciled account payable;

storing the reconciled account payable;

proceeding to a next account payable of the accounts payable data file;

exiting the loop when a last or other designated account payable of the accounts payable data file is reached;

determining that one of the accounts payable entries was not paid in accordance with the payables profile, and flagging the account payable as not paid to produce a non-reconciled account payable; and storing the non-reconciled account payable;

generate a report for each of the plurality of accounts payable based on the consolidated payment data; and transmit the report to a client device operated by the client.

16. The apparatus of claim 15, wherein the processing module further functions to:

store a plurality of payment method programs from a plurality of financial institutions, wherein a payment method program of the plurality of payment methods includes at least some of: identity of at least one of the plurality of financial institutions, at least one payment method, at least one associated processing fee for the at least one payment method, and at least one associated offer for the at least one payment method, wherein the at least one payment method includes one or more of credit card, a funds transfer, commercial paper, tangible consideration, and a debit account.

17. The apparatus of claim 16, wherein the processing module further functions to:

analyze the consolidated data with reference to the plurality of payment method programs; and further functions to perform at least one of:

with respect to the client, when the analyzing identifies a payment method option regarding at least one of: one or more account payables, transaction amount, a creditor, alternate creditor for service or goods, payment terms, and a creditor's financial institution that is favorable to a payment scheme associated with one of the plurality of accounts payable, generate a recommended alternative payment method report;

with respect to a financial institution of the plurality of financial institutions, when the analyzing identifies a payment method option regarding at least one of: one or more of a plurality of clients, a volume of transactions, an amount of a transaction, terms of payment, and one or more of a plurality of creditors that is favorable to one or more payment methods offered by the financial institution, generate a recommended payment method program report; and with respect to the creditor, when the analyzing identifies a payment method option regarding at least one of: the creditor's financial institution, client spending trends, the one or more of the plurality of clients, a volume of transactions with the one or more of the plurality of clients, the amount of a transaction, and the terms of payment, generate a recommended payment offer report.

18. The apparatus of claim 17, wherein the processing module further functions to analyze the consolidated data with reference to the plurality of payment method programs by:

entering a loop, the loop including:

comparing at least one of the payment schemes associated with one of the plurality of accounts payable in the accounts payable data file with the plurality of payment method programs;

when at least one of the plurality of payment method programs compares favorably to the at least one payment scheme, compiling the at least one of the plurality of payment method programs in an options list;

proceeding to a next account payable of the accounts payable data file;

exiting the loop when a last or other designated account payable of the accounts payable data file is reached.

19. The apparatus of claim 15, wherein the processing module further functions to generate the report by at least one of:

generating a reconciled client payment report;

generating a reconciled payment entity payment report;

generating a reconciled financial institution payment report;

generating a reconciled creditor payment report; and generating a client alternate payment method report, wherein the alternate payment method report identifies at least one account payable of the accounts payable data file that was paid using a payment method that differed from the payment scheme associated with the account payable.

20. The apparatus of claim 15, wherein the processing module further functions to:

when the account payable was not paid in accordance with the payables profile, correlating the account payable with the item in the remittance information to produce a correlated account payable;

storing the correlated account payable;

determining a payment difference between the correlated account payable and the payables profile;

storing the payment difference; and reconciling the payment difference with the correlated account payable to produce the reconciled account payable.

21. An apparatus comprising:

a processing module; and memory coupled to the processing module, wherein the processing module functions, at least partially based on operational instructions stored in the memory, to:

access an accounts payable data file, wherein the accounts payable data file includes a plurality of accounts payable entries and wherein each of the plurality of accounts payable entries has associated creditor information and a payment amount;

initiate payment transactions for the plurality of accounts payable entries in the accounts payable data file in accordance with a payment scheme associated therewith, wherein the payment scheme includes two or more of: a business credit card, a funds transfer, commercial paper, monetary consideration such as a rebate, refund, or exchange, and a debit account;

access payment remittance information and the accounts payable data file;

consolidate the accounts payable data file with the payment remittance information to produce a consolidated account payable that includes a determination of the payment remittance information for each of the respective accounts payable, wherein the determination indicates whether the account payable was paid in accordance with the payables profile, wherein the processing module further functions to consolidate the account payable with the payment remittance information to produce a consolidated account payable by:

comparing one of the accounts payable entries of the accounts payable data file with the remittance information;

determining that an item in the remittance information compares favorably with the accounts payable entry;

determining that the accounts payable entry was paid in accordance with the payables profile, and reconciling the accounts payable entry with the item in the remittance data to produce a reconciled account payable;

storing the reconciled account payable as the consolidated account payable;

determining that an accounts payable entry was not paid in accordance with the payables profile, and flagging the account payable as not paid to produce a non-reconciled account payable; and storing the non-reconciled account payable;

compile the consolidated account payable to produce consolidated accounts payable data;

generate a report for each of the plurality of accounts payables entries based on the consolidated accounts payable data; and transmit the report to a client device operated by a client that pays a plurality of creditors.

22. The apparatus of claim 21, wherein the processing module further functions to:

analyze the consolidated accounts payable data with reference to a plurality of payment method programs; and further functions to perform at least one of:

with respect to the client, when the analyzing identifies a payment method option regarding at least one of: one or more account payables, transaction amount, a creditor, alternate creditor for service or goods, payment terms, and a creditor's financial institution that is favorable to the payment scheme for one of the plurality of accounts payable entries in the accounts payable data file, generating a recommended alternative payment method report;

with respect to a financial institution of the plurality of financial institutions, when the analyzing identifies a payment method option regarding at least one of: one or more of a plurality of clients, a volume of transactions, an amount of a transaction, terms of payment, and one or more of a plurality of creditors that is favorable to one or more payment methods offered by the financial institution, generating a recommended payment method program report; and with respect to the creditor, when the analyzing identifies a payment method option regarding at least one of: the creditor's financial institution, client spending trends, the one or more of the plurality of clients, a volume of transactions with the one or more of the plurality of clients, the amount of a transaction, and the terms of payment, generating a recommended payment offer report.

23. The apparatus of claim 21, wherein the processing module further functions to generate the report by at least one of:

generating a reconciled client payment report;

generating a reconciled payment entity payment report;

generating a reconciled financial institution payment report;

generating a reconciled creditor payment report; and generating a client alternate payment method report, wherein the alternate payment method report identifies at least one accounts payable entry of the accounts payable data file that was paid using a payment method that differed from a payment method indicated in the payables profile.

24. The apparatus of claim 21, wherein the processing module further functions to:

when the accounts payable entry was not paid in accordance with the payables profile, correlating the accounts payable entry with the item in the remittance information to produce a correlated account payable;

store the correlated account payable;

determine a payment difference between the correlated account payable and the payables profile;

store the payment difference; and reconcile the payment difference with the correlated account payable to produce the reconciled account payable.

* * * * *